Dec. 11, 1962   F. P. SHARPE   3,067,472
SAND RING MACHINE
Filed Feb. 9, 1960   2 Sheets-Sheet 1
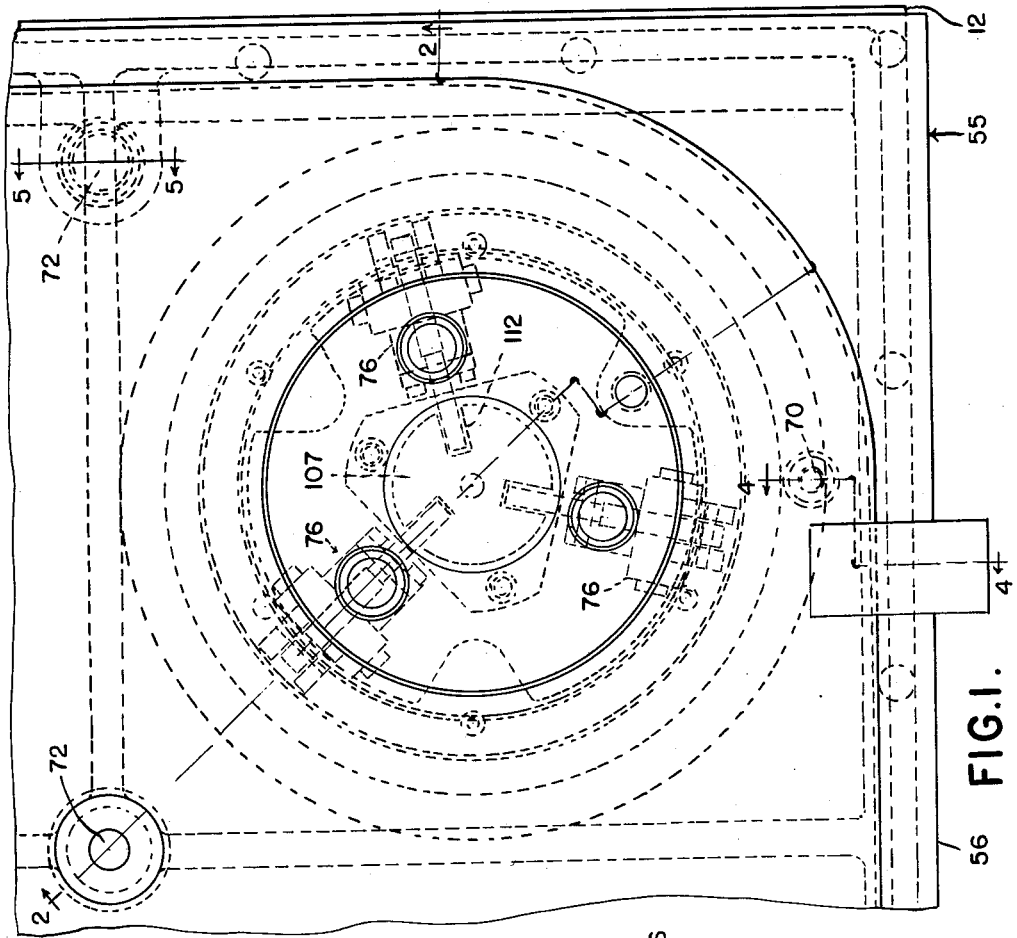
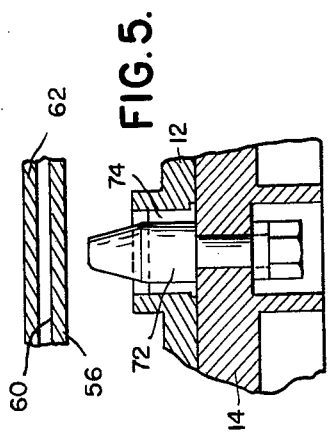
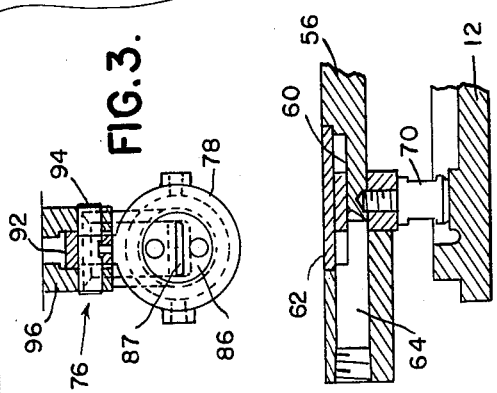
INVENTOR.
FREDERICK P. SHARPE
BY
Whittemore, Hulbert & Belknap
ATTORNEYS Dec. 11, 1962 F. P. SHARPE 3,067,472
SAND RING MACHINE Filed Feb. 9, 1960 2 Sheets-Sheet 2

INVENTOR.
FREDERICK P. SHARPE
BY
Whittemore, Hulbert & Belknap
ATTORNEYS

United States Patent Office 3,067,472
Patented Dec. 11, 1962

3,067,472
SAND RING MACHINE
Frederick P. Sharpe, Dearborn, Mich., assignor to Kelsey-Hayes Company, Detroit, Mich., a corporation of Delaware
Filed Feb. 9, 1960, Ser. No. 7,580
9 Claims. (Cl. 22—10)

This invention relates to apparatus for charging a mold and refers more particularly to a machine for charging a sand ring mold.

The invention has for one of its objects to provide a machine for charging a sand ring mold which accomplishes this function with only a minimum loss of sand.

The invention has for another of its objects to provide a machine as described above in which the mold is charged by a plurality of nozzles which have generally horizontal end portions terminating in discharge orifices respectively registerable with lateral filling openings in the mold, and means for ejecting molding material from the discharge orifices under pressure to fill the mold.

The invention has for a further object to provide a machine of the above type which is composed of a relatively few simple parts and yet which is highly efficient in the accomplishment of its intended function.

Other objects and features of the invention will become apparent as the following description proceeds, especially when considered in conjunction with the accompanying drawings wherein:

FIG. 1 is a fragmentary top plan view of a machine constructed in accordance with the invention.

FIG. 3 is a sectional view taken along the line 3—3 on FIG. 2.

FIG. 4 is a sectional view taken along the line 4—4 on FIG. 1.

FIG. 5 is a sectional view taken along the line 5—5 on FIG. 1.

Figures 2, 6:
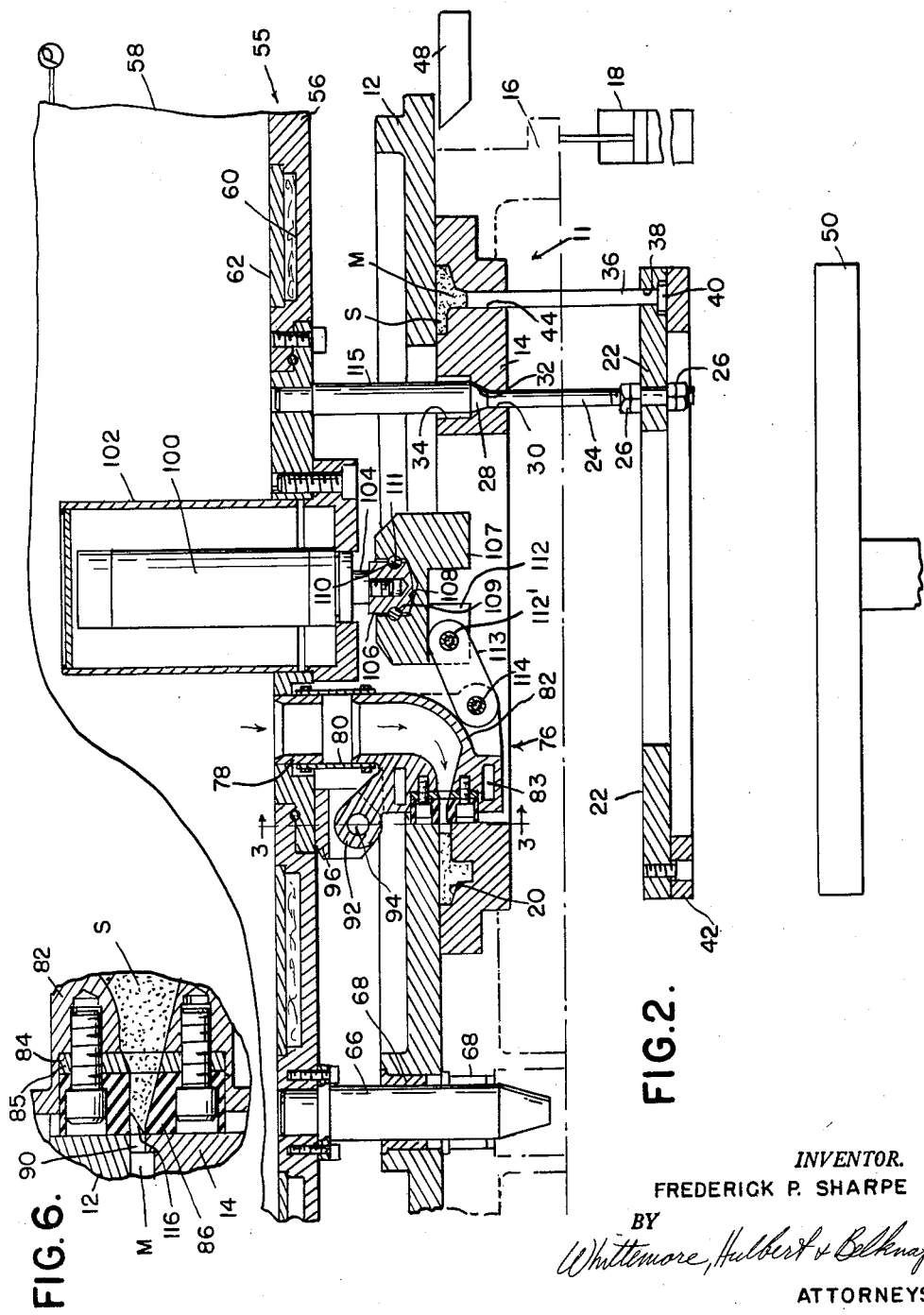
FIG. 2 is a sectional view taken along the line 2—2 on FIG. 1.
FIG. 6 is an enlargement of a portion of FIG. 2.

The machine of this invention is particularly adapted to make sand rings for use in the centrifugal casting of a liner in a brake drum shell, although it will be appreciated that the invention is not necessarily so limited, since molded articles of other shapes and for other uses might be made within the broad aspects of the invention.

Referring now more particularly to the drawings, only one quadrant of the machine is shown in plan in FIG. 1, it being understood that the other quadrants of the machine are similarly constructed. In FIG. 2, the sand ring mold M is formed by a core box 11 composed of the cooperating annular cope 12 and drag 14. The mold is ring shaped and it will be understood that the core box has four molds M, one in each quadrant, similar to the mold illustrated in FIGS. 1 and 2. The drag is supported on a base ring 16, which is raised and lowered by suitable mechanism such as the hydraulically operated piston and cylinder assembly diagrammatically indicated at 18. The drag has in its top surface an annular recess 20 which, when the drag is pressed up against the lower surface of the cope, defines the mold cavity.

A knock-out plate 22 is suspended from the drag. This plate is suspended from the drag by a plurality of pins 24. The pins 24 are rigidly secured to the knock-out plate in an annular series by the nuts 26 threaded thereon, and extend upwardly therefrom to a head 28 of inverted frusto-conical shape. The pins 24 extend upwardly into the reduced portions 30 of an annular series of holes in the drag, which reduced portions, at their upper ends, merge into the flared portions 32 which connect the portions 30 with the enlarged portions 34. The conical heads 28 are shaped to fit the flared portions 32 so that the knock-out plate 22 is suspended from the drag by the heads 28. The knock-out plate carries the knock-out pins 36 which project upwardly therefrom through the holes 38 which are counterbored on the under side to receive the heads 40 of the pins. The heads 40 are clamped in position within the counterbores by the ring 42 secured to the under side of the knock-out plate. Hence the knock-out pins 36 are rigidly carried by the knock-out plate. The upper ends of the knock-out pins are slidably received in passages 44 which project into the recess 20 of the drag. In the normal position of the pins, when the knock-out plate is suspended from the drag, the upper ends of the pins are flush with the bottom of the recess. The pins are arranged in an annular series and are adapted to extend into the recess when the mold is opened to disengage the molded ring S.

When the mold is closed the cope 12 is supported on the drag above the supporting elements 48. When the drag is lowered to open the mold, the cope is caught on the supports 48. During opening of the mold, the ring 42 on the knock-out plate engages the fixed platen 50 so that continued downward movement of the drag will cause the upper ends of the knock-out pins 36 to project into the recess 20 to disengage and eject the molded ring. The core box may be heated to facilitate the cure of the sand within the mold.

In FIG. 2, the core box is shown in the "blow" position, during which time the mold cavity is charged with molding sand and the sand is given time to set within the mold before it is removed.

The structure for filling the mold cavity with sand is located above the core box and comprises a blow head generally indicated at 55. The blow head comprises a fixed blow plate 56, which defines the bottom surface of a sand hopper 58. The blow plate is provided with an annular recess 60 in each quadrant which is closed by an annular plate 62 to define a water channel to cool the blow plate. The channel is filled through a filling opening 64 (FIG. 4). The up and down movement of the cope and drag is guided by a central pin 66 depending from the blow plate and slidably received in bushings 68 carried by the cope and drag. As seen in FIG. 4, the blow plate also carries a fixed stop 70 engageable with the cope to limit its upward movement. Referring to FIG. 5, the drag carries a fixed upwardly extending pin 72 engageable in a bushing 74 of the cope to align and guide the relative vertical movements thereof. The sand hopper 58 is adapted to contain a supply of sand, preferably of a thermosetting resinous material, and air pressure is periodically applied to the sand in the hopper on the order of about 40 p.s.i. to charge the sand ring mold by the apparatus about to be described. A pump P is provided for this purpose.

The blow plate, in the quadrant illustrated in FIGS. 1 and 2, is provided with an annular series of nozzles generally indicated at 76. It will be understood that the blow plate is similarly provided with nozzles in the other quadrants to thereby fill the mold cavities of the core box in these other quadrants. One of the nozzles is shown in FIGS. 2, 3 and 6 and it will be understood that the other nozzles are similarly constructed. The nozzle there illustrated comprises a fixed tube 78 carried by the blow plate and opening into the hopper to receive sand therefrom. A flexible sleeve 80 is secured at its upper end to the tube 78 in telescoping relation therewith and extends downwardly therefrom where it is secured in telescoping relation to the lower nozzle section 82. The lower nozzle section 82 extends downwardly from the sleeve 80 and has a generally radially outwardly extending horizontal end portion, as shown, so that the lower nozzle section is formed of portions generally at right angles to each other. The interior of the lower nozzle section 82 is of course in communication with the tube 78 and sleeve 80 to receive sand from the hopper, and tapers to a considerably reduced diameter in the horizontal portion thereof. The lower nozzle section 82 has an annular channel 83 for the circulation of a suitable coolant.

The outlet portion of the nozzle is formed with a recess 84 (FIG. 6) in which an annular metal plate 85 is disposed having a tapered passage in communication with the passage in the nozzle section 82. Also supported in recess 84 outwardly of the metal plate 85 is an annular flexible resilient deformable member 86 the passage of which is tapered and in communication with the passage in the metal member. The hollow interior of the lower section 82 is of gradually reduced cross-section towards its outlet, leads into the passage in the metal plate which is likewise of gradually reduced cross section, and this passage in turn opens into the passage in the flexible member 86 which also is of gradually reduced section so that the outlet of the member defines a narrow outlet for the nozzle. The outlet end of the passage in the member 86 is long and narrow as indicated at 87 in FIG. 3. The annular members 85 and 86 are clamped in the recess by the bolts 88, and the radially outer surface of the flexible member 86 is adapted to have flush sealing engagement with the radially inner surfaces of the cope and drag.

It will be noted in FIG. 2 that the radially inner surfaces of the cope and drag are cylindrical and flush with one another and the engaging surface of the member 86 is similarly shaped for flush engagement. The top surface of the drag is formed with a plurality of recesses which cooperate with the bottom surface of the cope when the core box is closed to define a plurality of angularly spaced mold inlet passages 90 which are arranged to register respectively with the outlets of the nozzles. The passages 90 are shaped like the outlet orifices 87 of the nozzles.

The lower nozzle sections 82 are supported for radially inward and outward movement. As shown, the lower sections 82 have the integral arms 92 which are pivoted to the pins 94 carried by and extending across the space between the legs of the supporting member 96. The lower nozzle sections 82 are pivoted inwardly and outwardly by structure including the vertical air cylinder 100. The air cylinder 100 is supported within a housing 102 carried by the blow plate and extending upwardly into the hopper. A piston (not shown) reciprocal within the air cylinder 100 has a depending connecting rod 104 which has secured to the lower end thereof a cylindrical member 106 which has a spherical lower end. A spider 107 has an upwardly opening cylindrical recess 108 which is conical at the bottom and engages the spherical lower end of member 106 received therein. Spider 107 is bored to provide a pair of parallel straight circular holes 109 which intersect the recess 108 on opposite sides thereof and which register with the straight circular grooves 110 in opposite sides of the cylindrical wall of the member 106. Pins 111 are inserted into the holes 109 and engage in grooves 110 to retain the member 106 in the recess. The member 106 is of somewhat smaller diameter than the recess 108 to provide the clearance shown, and the grooves 110 are somewhat larger than the pins 111 so that the spider 107 may swivel on member 106 in all directions. Thus the spider can compensate for wear and uneven compression of the flexible members 86 so that an adequate seal can be obtained at each nozzle. In practice very little swivel is necessary, and may be on the order of 1/32".

The spider is formed with the three angularly spaced radial slots 112, and pins 112' extend across the slots and pivotally support the toggle links 113 which are pivoted at their outer ends to pins 114 carried by the lower nozzle sections 82. The air cylinder is double-acting and in the upper position of the piston the toggle links are moved to the dotted line position of FIG. 2 in which the lower nozzle sections are withdrawn radially inwardly. When the piston is moved downwardly, the links 113 move to the solid line position in which the lower nozzle sections are urged radially outwardly into "blow" position with the members 86 pressed against the inner surfaces of the cope and drag and the outlet orifices registering with the inlets 90 to the mold cavity.

Referring to FIG. 2, it will be seen that the blow plate carries a plurality of depending pins 115 which register with the enlarged portions 34 of the holes in the drag, the inner diameter of the cope being enlarged in the areas of the pins 115 to clear the latter. The pins 115 engage the upper ends of heads 28 of the suspension pins 24 when the core box moves up to "blow" position, assuring that the pins 36 are down and clear of the mold cavity.

The operation of the apparatus will now be described. In the "blow" position illustrated in FIG. 2, the air cylinder is operated to lower the spider 107 and thereby move the lower nozzle sections 82 outwardly for sealing engagement of the members 86 with the core box and with the discharge orifices thereof in registration with the inlets to the mold cavity. There is enough play provided by the swivel mounting of spider 107 to obtain an adequate seal at each nozzle orifice. In this position, air under pressure is introduced to the hopper to force the sand therein through the nozzles and into the mold cavity to fill the latter. The air pressure is thereafter removed and the piston of the air cylinder is raised to withdraw the lower nozzle sections 82 so that their outlets are spaced from the core box. Only a very small amount of sand is at this time lost from the outlet orifices of the nozzles as will be appreciated from the angle of repose of the sand S indicated at 116 in FIG. 6. After the sand has had time to cure, assisted by suitable heating means, if desired, the cylinders 18 are operated to lower the core box until the ring 42 of the knock-out plate engages platen 50 so that continued downward movement of the drag will cause the knock-out pins to eject the molded sand ring. Sand may be simultaneously formed in the molds of the other quadrants of the core box, and the single hopper may serve all of the molds.

If the nozzles were vertical and the discharge orifices entered the mold from above, it would be apparent that much more sand would be lost. The discharge orifices might be reduced to cut sand losses, but there is a limit to this since the sand has a tendency to cure in the nozzle due to the heat involved. If the orifices are too small, the sand would cure and plug up the nozzles.

What I claim as my invention is:

1. Apparatus for producing molded articles from a granular molding material comprising means providing a mold cavity, means for filling said mold cavity with a granular molding material including a plurality of nozzles, said mold cavity having a plurality of lateral filling openings, said nozzles having extended tubular end portions the axes of which are approximately horizontal, said tubular end portions terminating in discharge orifices respectively registrable with said lateral filling openings to sealingly engage said filling openings, means for shifting said nozzles between an advanced position in which said orifices make sealing contact with said filling openings and a retracted position in which said orifices are spaced from said filling openings, said shifting means including an actuating member and a connection between said actuating member and said nozzles including a member swiveled on said actuating member, said connection enabling the orifices of all of said nozzles to make proper sealing contact with said filling openings, said end portions of said nozzles remaining substantially horizontal in both advanced and retracted positions and in intermediate positions, and means for ejecting the molding material from the discharge orifices of said nozzles under pressure.

2. Apparatus for producing molded articles from a granular molding material comprising means providing a mold cavity, means for filling said mold cavity with a granular material including a hopper for said material, a blow head beneath said hopper, a plurality of nozzles depending from and pivoted to said blow head and communicating with said hopper, said mold cavity having a plurality of lateral filling openings, said nozzles having extended tubular end portions the axes of which are approximately horizontal, said tubular end portions terminating in discharge orifices respectively registrable with said filling openings to sealingly engage said filling openings, means for shifting said nozzles between an advanced position in which said orifices make sealing contact with said filling openings and a retracted position in which said orifices are spaced from said filling openings including a pressure operated piston cylinder assembly having a cylinder carried by said blow head and a piston reciprocable within said cylinder, a member movable by said piston and toggle links pivoted to said member and said respective nozzles, said end portions of said nozzles remaining substantially horizontally in both advanced and retracted positions and in intermediate positions, and pressure means acting on the material in said hopper for ejecting the same from the discharge orifices of said nozzles.

3. Apparatus for producing annular molded articles from a granular material comprising means providing an annular mold cavity, means for filling said mold cavity with a granular material including a blow head having an annular series of nozzles, said blow head including a blow plate to which said nozzles are pivoted, means for relatively vertically moving said mold cavity and blow head between operative and inoperative positions, in said operative position said nozzles being adjacent said annular mold cavity, said mold cavity having a plurality of lateral filling openings opening radially inwardly relative to said annular mold cavity, said nozzles having radially outwardly turned extended tubular end portions the axes of which are approximately horizontal, said tubular end portions terminating in discharge orifices respectively registrable with said filling openings in said operative position to sealingly engage said filling openings, means for radially shifting said nozzles about their pivots between an outer limit in which said orifices make sealing contact with said filling openings and an inner limit in which said orifices are spaced inwardly from said filling openings, said shifting means including toggle means connected to said nozzles and single means for simultaneously operating said toggle means, said outwardly turned end portions remaining substantially horizontal at both inner and outer limits and intermediate positions, and means for ejecting the molding material from the discharge orifices of said nozzles under pressure.

4. The apparatus defined in claim 3 wherein said nozzles have annular portions of flexible, deformable, resilient material defining said discharge orifices for sealing engagement with said lateral openings, and a lost-motion connection between said single means and said toggle means to compensate for wear and uneven compression of said resilient material.

5. Apparatus for producing annular molded articles from a granular molding material comprising means providing an annular mold cavity, means for filling said mold cavity with a granular molding material including a hopper for said material, a blow head beneath said hopper, said blow head including a blow plate and a plurality of nozzles depending from and pivoted to said blow plate and communicating with said hopper, said nozzles being arranged in an annular series, means for relatively vertically moving said mold cavity and blow head between operative and inoperative positions, in said operative position said nozzles being adjacent said annular mold cavity, said mold cavity having a plurality of lateral filling openings opening radially inwardly relative to said annular mold cavity, said nozzles having radially outwardly turned extended tubular end portions the axes of which are approximately horizontal, said tubular end portions terminating in discharge orifices respectively registrable with said filling openings in said operative position, said nozzles having portions of resilient material defining said discharge orifices for sealing engagement with said lateral openings, the end portion of each nozzle tapering to a progressively smaller cross-section toward its discharge orifice, means for simultaneously radially pivoting said nozzles between a radially outer limit in which said orifices make sealing contact with said lateral openings and a radially inner limit in which said orifices are spaced inwardly from said lateral openings including a fluid pressure-operated piston cylinder assembly having a cylinder carried by said blow plate and a piston reciprocable within said cylinder, a member movable by said piston and toggle links pivoted to said member and said respective nozzles, said outwardly turned end portions remaining substantially horizontal at both inner and outer limits and intermediate positions, and pressure means acting on the material in said hopper to eject the molding material from the discharge orifices of said nozzles.

6. Apparatus as in claim 5 in which the member movable by said piston has a swivel connection therewith to compensate for wear and uneven compression of said resilient material.

7. Apparatus for producing molded articles from a granular molding material comprising means providing a mold cavity having a plurality of spaced lateral filling openings in a side wall thereof, means for filling said mold cavity with a granular molding material including a plurality of spaced generally L-shaped nozzles respectively associated wtih said lateral filling openings, each nozzle having angularly related contiguous first and second tubular portions, the first tubular portion of each nozzle being generally upright and extending from a level above the associated lateral filling opening downwardly to approximately the level of said lateral filling opening at its juncture with the second tubular portion thereof, the second tubular portion of each nozzle extending from its juncture with the first tubular portion thereof in a substantially horizontal direction and terminating in a discharge orifice displaced laterally a substantial distance from said juncture, said discharge orifices being respectively registrable with said lateral filling openings to sealingly engage said filling openings, means for pivoting said nozzles between an advanced position in which said orifices make sealing contact with said lateral filling openings and a retracted position in which said orifices are spaced from said lateral filling openings, said second tubular portions of said nozzles remaining substantially horizontal in both advanced and retracted positions and in intermediate positions, said first tubular portions of said nozzles remaining generally upright in both advanced and retracted positions and intermediate positions, and means for ejecting the molding material from the discharge orifices of said nozzles under pressure when said nozzles are in their advanced positions.

8. Apparatus for producing annular molded articles from a granular molding material comprising means providing an annular mold cavity, means for filling said mold cavity with a granular molding material including a blow head having an annular series of nozzles, means for relatively vertically moving said mold cavity and blow head between operative and inoperative positions, in said operative position said nozzles being adjacent said annular mold cavity, said mold cavity having a plurality of lateral filling openings opening radially inwardly relative to said annular mold cavity, each nozzle having angularly related contiguous first and second tubular portions, the first tubular portion of each nozzle being generally upright and in said operative position extending from a level above the associated lateral filling opening downwardly to approximately the level of said lateral filling opening at its juncture with the second tubular portion thereof, the second tubular portion of each nozzle extending from its juncture with the first tubular portion thereof in a substantially horizontal direction terminating in a discharge orifice displaced laterally from said first tubular portion, said discharge orifices being respectively registrable with said filling openings in said operative position to sealingly engage said filling openings, means for radially shifting said nozzles between an outer limit in which said orifices make sealing contact with said filling openings and an inner limit in which said orifices are spaced inwardly from said filling openings, said second tubular portions of said nozzles remaining substantially horizontal at both inner and outer limits and intermediate positions, said first tubular portions of said nozzles remaining generally upright at both inner and outer limits and intermediate positions, and means for ejecting the molding material from the discharge orifices of said nozzles under pressure.

9. The apparatus defined in claim 8, wherein said blow head includes a blow plate and said nozzles are pivoted to said blow plate for movement between said limits.

References Cited in the file of this patent

UNITED STATES PATENTS

| | | |
|---|---|---|
| 1,034,334 | Bannister | July 30, 1912 |
| 2,363,463 | Pfeiffer | Nov. 21, 1944 |
| 2,832,107 | Weaver | Apr. 29, 1958 |
| 2,856,653 | Sutter | Oct. 21, 1958 |